United States Patent [19]

Kitamura

[11] Patent Number: 4,657,045

[45] Date of Patent: Apr. 14, 1987

[54] NOISE-PREVENTING STRUCTURE FOR WATER MIXING COCKS

[75] Inventor: Yoshiaki Kitamura, Yamagata, Japan

[73] Assignee: Kitamuragokin Ind. Co., Ltd., Gifu, Japan

[21] Appl. No.: 695,244

[22] Filed: Jan. 28, 1985

[51] Int. Cl.[4] ............................................. F16K 11/06
[52] U.S. Cl. .............................. 137/625.4; 137/625.17
[58] Field of Search ............ 137/625.4, 625.41, 614.2, 137/625.17

[56] References Cited

U.S. PATENT DOCUMENTS

| | | | |
|---|---|---|---|
| 3,533,436 | 10/1970 | Parkison | 137/625.4 X |
| 3,854,493 | 12/1974 | Farrell | 137/625.4 |
| 3,965,936 | 6/1976 | Lyon | 137/625.4 X |
| 4,157,099 | 6/1979 | Delker et al. | 137/625.4 X |

FOREIGN PATENT DOCUMENTS

| | | | |
|---|---|---|---|
| 2307594 | 8/1974 | Fed..Rep. of Germany | 137/560 |
| 2937475 | 4/1981 | Fed. Rep. of Germany | 137/625.4 |
| 1179942 | 2/1970 | United Kingdom | 137/625.4 |

Primary Examiner—Martin P. Schwadron
Assistant Examiner—John S. Starsiak, Jr.
Attorney, Agent, or Firm—Wenderoth, Lind & Ponack

[57] ABSTRACT

A water mixing cock has a noise-preventing structure and comprises a fixed plate, an opposing movable plate valve, a hollow chamber in the movable plate valve, a valve operator for rotating the movable plate valve so that either hot or cold or mixed water is allowed to flow through the hollow chamber, a discharge water passage in communication with the hollow chamber, and a variable escape groove for communicating the hollow chamber and the discharge water passage with each other only when hot water is allowed to flow through the hollow chamber. The noise-preventing structure is a sound arresting member disposed in an inlet portion of the movable plate valve in such a manner that noise occurring when the movable plate valve is rotated by the valve operator is minimized.

2 Claims, 19 Drawing Figures

FIG. 5
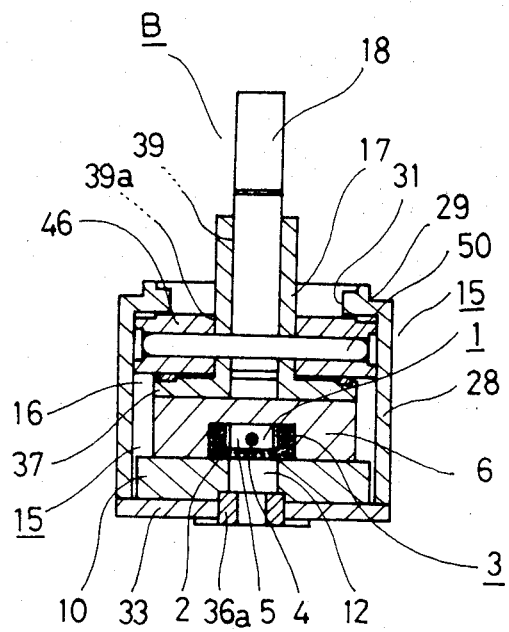
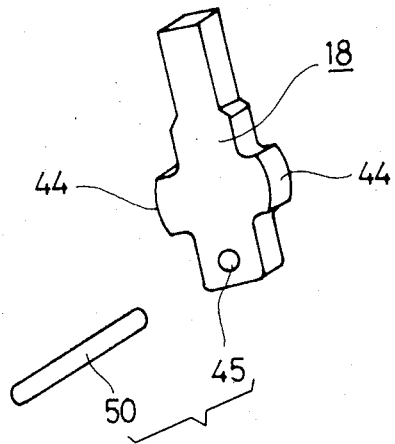
FIG. 6A
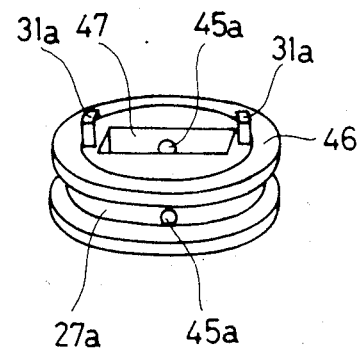
FIG. 6B

NOISE-PREVENTING STRUCTURE FOR WATER MIXING COCKS

BACKGROUND OF THE INVENTION

1. Field of the Invention:

This device relates to a noise-preventing structure for water mixing cocks, which use a pair of ceramic plate valves. Among sanitary washing machines, such as faucets, the structure is capable of preventing the occurrence of noise and an increase in the internal pressure when a valve is opened suddenly, and improving the operation efficiency thereof.

2. Description of the Prior Art:

There are conventional structures for preventing the occurrence of noise in a valve portion of a water cock using a plate valve, which structures are disclosed in FIGS. 5 and 14 (FIGS. 8a and 8b in the present application) in Japanese Utility Model Publication No. 4298/1982.

These conventional noise-preventing structures will be described briefly with reference to FIGS. 8a and 8b. The structure shown in FIG. 8a has a fluid passage 55 formed in a movable plate valve 54. An elongated net member 56 bent in the shape of the letter "V" is set in a space in the fluid passage 55 by utilizing the resiliency thereof, in such a manner that the net member 56 extends across the fluid passage 55. The structure shown in FIG. 8b also has a net member 56a which is bent in the shape of a butterfly and is set in a fluid passage 55a by utilizing the resiliency thereof.

In these noise-preventing structures, the net member is set in the space in the fluid passage so as to extend across the direction of a flow of a fluid, so that substantially the whole of the extraneous matter contained in the fluid can be collected conveniently. However, when extraneous matter begins to clog the net member, the water, the flow rate and pressure of which are very high even when the valve is opened with the net member in a non-clogged state, flows against the net member with a great impact. Therefore, the resiliency of the net member alone is not able to counteract such a high water pressure; hence, there is the possibility that the net member is readily deformed. When the net member is clogged in a one-sided manner, the flow rate of either the hot water or the cold water is limited greatly. This hampers the smooth valve opening and closing operations, so that the temperature-regulating efficiency decreases to a great extent. In order to remove the extraneous matter from the net member, it is necessary that the portion of the structure which functions as a valve be disassembled. Such a disassembling operation can be done only by a skilled craftsman, and cannot easily be done by an oridinary person in a house.

OBJECTS AND BRIEF SUMMARY OF THE INVENTION

An object of the device in the present application is to provide a noise-preventing structure for water mixing cocks. The structure is capable of solving the above-mentioned problems, and includes a sound arrester member consisting of a porous foamed metal or a net. The member is set via a support member on the inner side of an end surface of an inlet portion of a through chamber which is formed in a movable plate valve by hollowing the same. A pressure of a jet stream of a fluid, which occurs when a valve mechanism is opened suddenly, impinges upon or skims along an end surface of the sound arrester member which reduces noise that occurs when the valve mechanism is opened suddenly. A smooth operation of the movable plate valve results and prevents the water in a water passage from being thermally expanded while the hot water alone is fed.

This device consists basically of a fixed ceramic plate having inlets for hot water and cold water and an outlet for mixed water; a movable ceramic plate valve is provided with a substantially half-square and half-rounded, bottomed through chamber. A variable escape groove communicates with the through chamber, a water passage, and a recess in which a lubricant or a lubricant-impregnated material is fitted. A valve chamber is set in a water mixing cock, in which chamber the fixed plate and movable plate valve are set opposite each other in such a manner that the movable plate valve can be slid on the fixed plate. A sound arrester unit consists of a water-permeable sound arrester member and is composed of a porous foamed metal, a net or steel wool. The sound arrester member is attached to an inner surface of an inlet portion of the through chamber in the movable plate valve via a support member in such a manner that one end surface of the sound arrester member extends along and in parallel with an end surface of the inlet portion of the through chamber. A valve base is provided with a plurality of tenons on one surface thereof. A cross-sectionally rectangular, hollow journal box has a plurality of elongated, aligned bores in the opposite side walls thereof. An operating shaft is inserted in the rectangular hollow in the journal box and is held at the portion thereof which is between the elongated bores on a support member fitted therein, in such a manner that the operating shaft can be moved pivotally in only one direction. A movable seat is provided with a plurality of downwardly-extending tenons on its lower surface and is joined unitarily to the journal box. A cross-sectionally circular ring has diametrically-aligned pin-inserting bores which are also aligned with the elongated bores in the journal box. A bore extends from one end surface of the ring to the other thereof at right angles to the pin-inserting bores and has a rectangular cross-section similar to and slightly larger than that of the hollow in the journal box. A cylindrical valve case has a flange-like guide groove of a smaller diameter on its upper surface, rotation-preventing members on the inner side of the guide groove, and a plurality of tenon-inserting recesses in a bottom surface of the circumferential wall thereof. The valve base, fixed plate, and movable plate valve are set in a stack in the valve chamber, and the journal box, which has the operating shaft supported therein and the ring fitted therearound, is joined to the valve case.

BRIEF DESCRIPTION OF THE DRAWINGS

FIG. 5 is a longitudinal section view of a valve operating mechanism which is roughly assembled;

FIGS. 6A, 6B, 7A, 7B, 7C and 7D are perspective views of each part in a disassembled state of the valve operating mechanism.

DETAILED DESCRIPTION OF THE PREFERRED EMBODIMENT

An embodiment of this device will now be described with reference to the drawings.

Figure 2A:
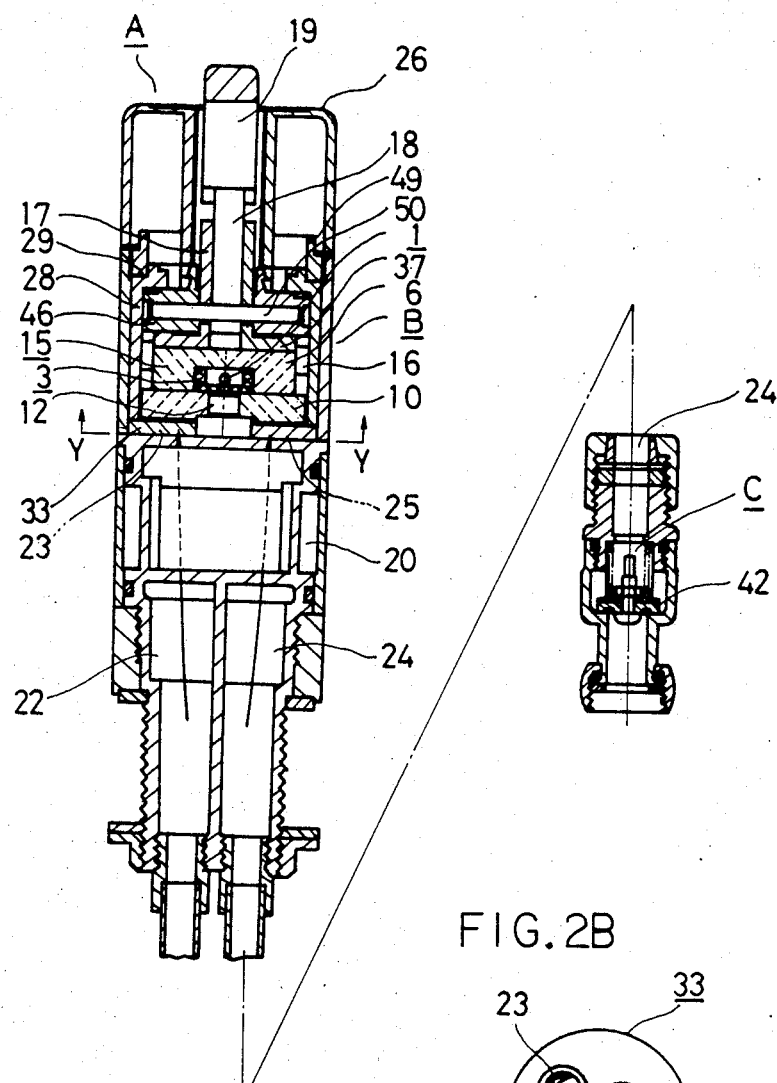
FIG. 2A is a sectioned front elevation view taken along the line X—X in FIG. 1.
Figure 2B:
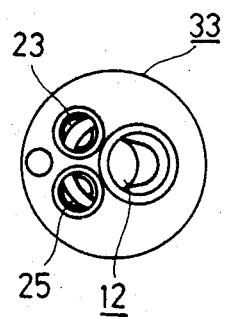
FIG. 2B is an enlarged bottom view taken along the line Y—Y in FIG. 2A.
Figure 3A:
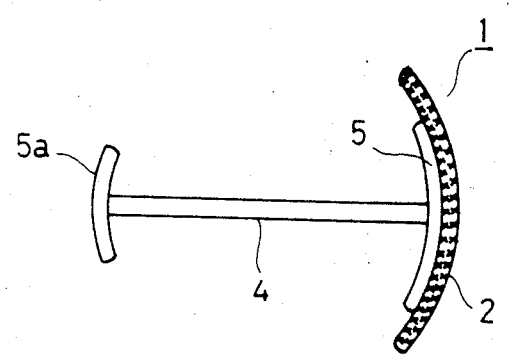
FIG. 3A is an enlarged plan view of a sound arrester unit.
Figure 3B:
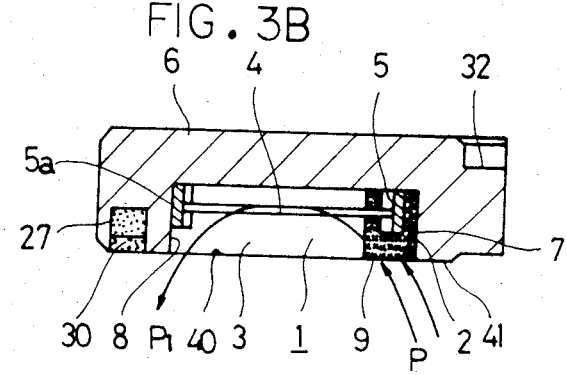
FIG. 3B is an enlarged, sectioned side elevation view taken along the line Z—Z in FIG. 4B.
Figure 3C:
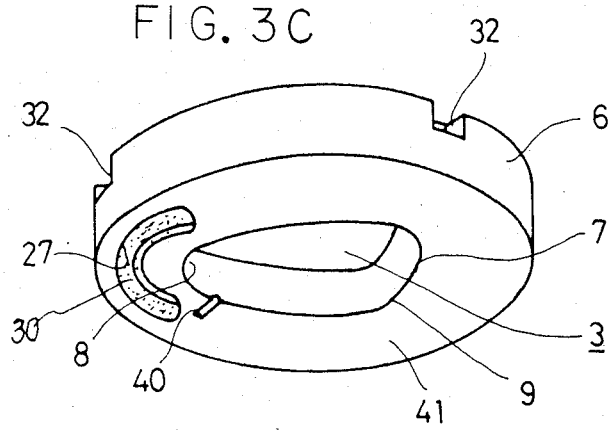
FIG. 3C is a bottom view in perspective of a movable plate valve alone.
Figure 4A:
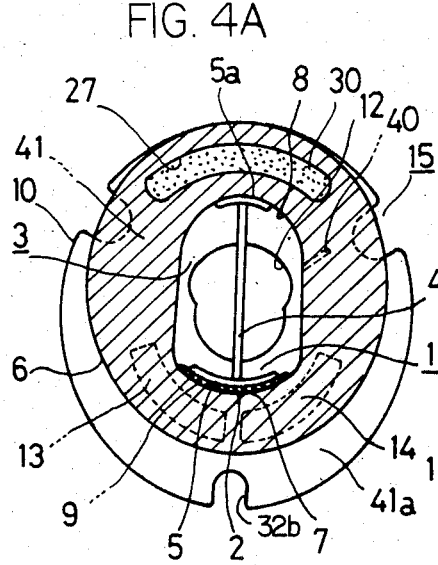
FIGS. 4A, 4B, 4C and 4D illustrate the way of opening a valve mechanism.

As shown in FIGS. 3A, 3B and 4A, a sound arrester unit 1 consists of a plate type sound arrester member 2 composed of a porous foamed metal, a net or steel wool, and a support member 4 having a substantially H-shaped horizontal section and fixing the sound arrester member 2 to the inner surface of a through chamber which will be described later. The support member 4 has contact members 5, 5a at both ends thereof, and the distance between these contact member (5, 5a) is substantially equal to the larger inner diameter of the through chamber 3 and short enough to hold the sound arrester member 2 between the contact member 5 and the opposed portion of the inner surface of the through chamber 3. The through chamber 3 is formed by hollowing one surface of a disc type movable plate valve 6 which is molded out of a ceramic material. This through chamber 3 is a bottomed chamber having a half-square and half-rounded horizontal section. The should arrester unit 1 is set in the through chamber 3 so that the support member 4 of the unit 1 is inserted between an inner surface 7 of an inlet portion of the chamber 3 and an inner surface 8 of an outlet portion thereof. The inner surfaces 7, 8 are opposite each other with respect to a larger inner diameter of the through chamber 3, with the sound arrester member 2 held firmly between the contact member 5 of the support member 4 and the inner surface 7 opposed to the inlet portion of the through chamber 3 in such a manner that one end surface of the sound arrester member 2 extends in parallel with an end surface of the inlet portion of the through chamber 3. A substantially arcuate recess 27 is provided in the portion of a cut-off surface 41 which is at one side of the through chamber 3, in such a manner that the recess 27 surrounds one side portion of the through chamber 3, as shown in FIGS. 3B and 3C. An oil-impregnated material 30 is fitted in this recess 27. A lubricant may optionally be packed directly in the recess 27, or attached forcibly and resiliently to the portion of the fixed plate 10 which is shown in FIGS. 4A-4D on the side of the recess 27, i.e. the cut-off surface 41a. A variable escape groove 40 provided in the cut-off surface 41 of the movable plate valve is shallow and short. When the variable escape groove 40 is in a position shown in FIG. 4D, the through chamber 3 and the cold water inlet 14 are communicated with each other. Consequently, the water in the through chamber 3 and the water between the through chamber 3 and a check valve 42 in a check valve unit C (FIG. 2A), which is provided in an intermediate portion of an upstream water passage 34, is heated with the hot water which passes continuously through the chamber 3. When the volume of this hot water starts increasing, the expanded portion of the hot water is discharged into the through chamber 3 from the variable escape groove 40, best shown in FIG. 4. The fixed plate 10 is also a disc type plate molded out of a ceramic material, and has a cut-off surface 41a. A mixed water outlet 12 is provided in the central portion of the cut-off surface 41a so as to extend from one surface to the other of the fixed plate 10. The mixed water outlet 12 is formed in such a manner that the outlet 12 mates with the central portion of the inner surface 8 of the outlet portion of the through chamber 3 when the valve mechanism is opened, or the left or right portion of the inner surface 8 in a normal condition. The fixed plate 10 is further provided with a hot water inlet 13 and a cold water inlet 14, which are made in the same manner through the portions thereof which are on the same circle having as the center thereof the center of the outlet 12. The outer edge lines of the hot water inlet 13 and cold water inlet 14 are substantially in alignment with the curved end surface 9 of the inlet portion of the through chamber 3. When the end surface 9 on the inlet side is in a position shown in FIG. 4B, it is opposed substantially equally to the hot water inlet 13 and the cold water inlet 14. When the end surface 9 on the inlet side is in a position shown in FIG. 4C, the cold water inlet 14 is fully opened. When the end surface 9 is opposite the hot water inlet 13 in the manner as shown in FIG. 4D, they are communicated so as to fully open the hot water inlet 13. The movable plate valve and fixed plate 10 thus form a valve mechanism 15. This valve mechanism 15 is set in the valve chamber 16 in the water mixing cock A shown in FIGS. 2A and 2B, in a manner which will be described later, with the fixed plate 10 held firmly in the valve chamber 16 and with the movable plate valve 6 stacked on the fixed plate 10. The movable plate valve 6 is connected to some other parts so that it can be shifted from a valve-closing position shown in FIG. 4A to a position shown in FIG. 4B, in which the hot water and cold water is discharged at the same flow rate, or a position shown in FIG. 4C, in which the cold water only is discharged, or a position shown in FIG. 4D, in which the hot water only is discharged, by operating the journal box 17 (FIG. 2A), which is joined to tenon-inserting recesses 32 (FIG. 3C) in the upper end surface of the movable plate valve 6, and a lever 19 (FIG. 2A) connected to the operating shaft 18 supported in the journal box 17. The mixed water, hot water or cold water passing through the chamber 3 flows into a water discharge pipe 21 as shown by an arrow in FIG. 1, via a passage 20 which is communicated with the outlet 12. The hot water from a hot water passage 22 shown in FIG. 2A flows from a hot water outlet 23 shown in FIG. 2B, into the hot water inlet 13 shown in FIG. 4B. The cold water from a cold water passage 24 flows from a cold water inlet 14 shown in FIG. 4B. The cold water from a cold water passage 24 flows from a cold water outlet 25 shown in FIG. 2B, into the cold water inlet 14 shown in FIG. 4B. The valve mechanism 15 is thus constructed.

Figure 1:
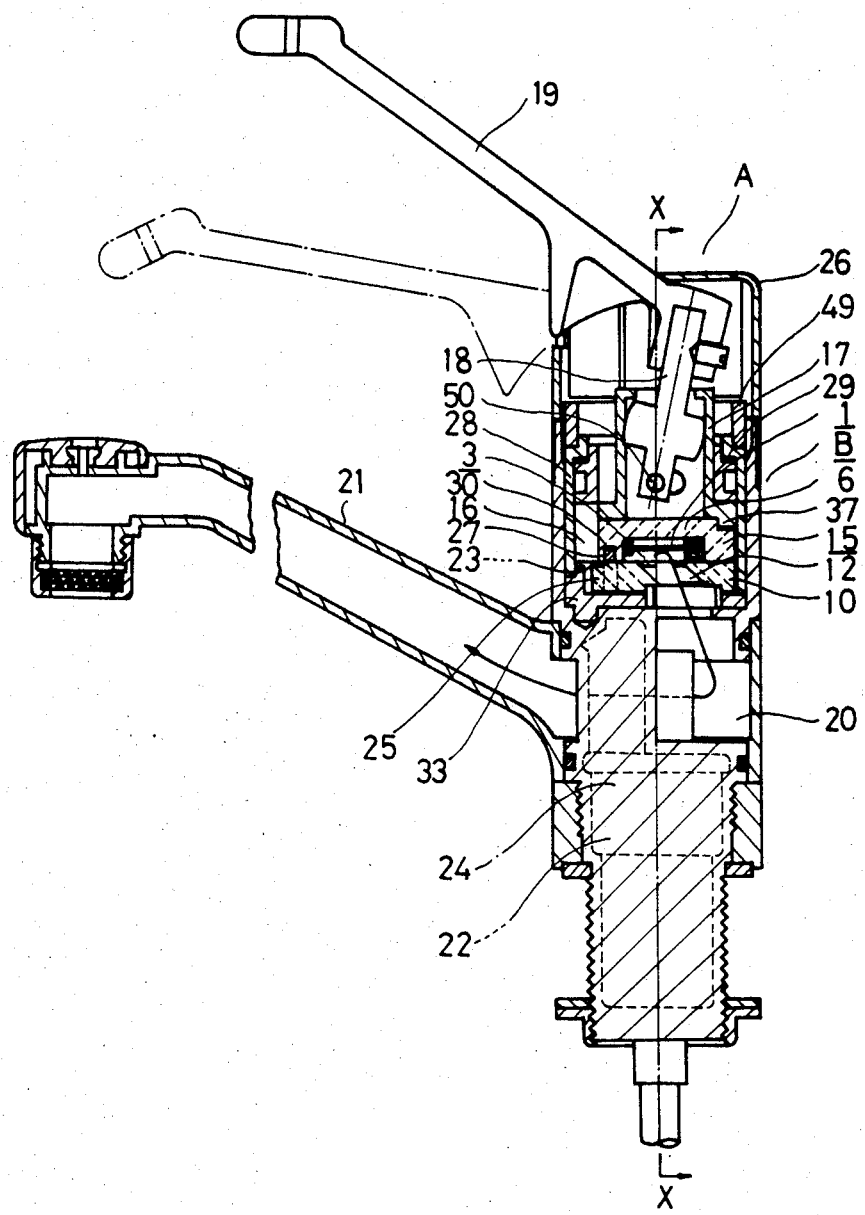
FIG. 1 is a sectioned side elevation view of a water mixing cock provided with the noise-preventing structure according to this device.
Figure 7A:
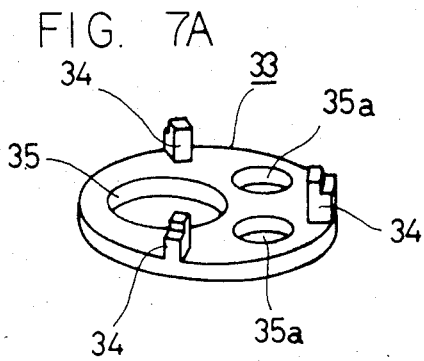
Figure 7B:
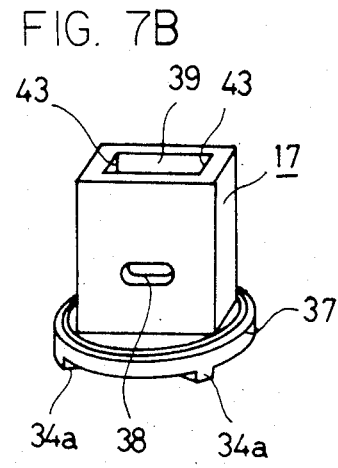
Figure 7C:
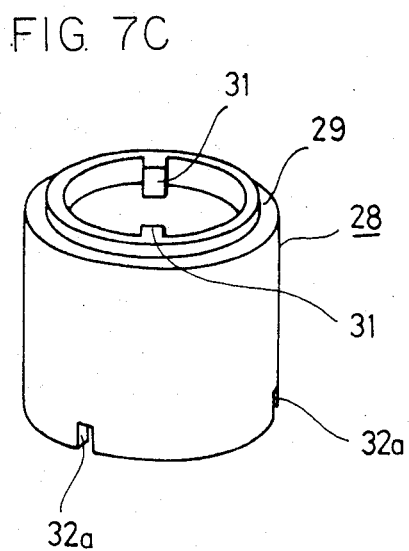
Figure 7D:
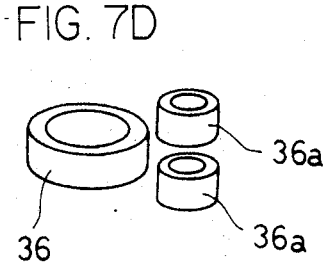
Figure 8A:
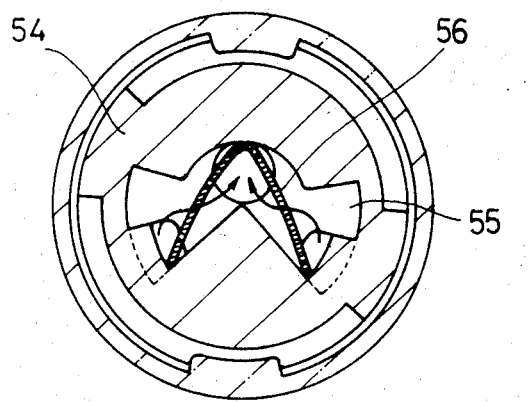
FIGS. 8A and 8B illustrate prior art noise-preventing structures for water mixing cocks.
Figure 8B:
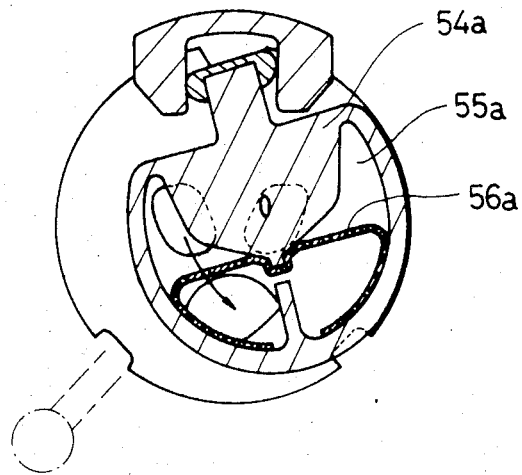

The valve-operating mechanism B is constructed as shown in FIGS. 5, 6A, 6B, 7A, 7B, 7C and 7D. Namely, the valve case 28 shown in FIG. 5 is formed in a substantially cylindrical shape and has the rotation preventing member 31 adapted to prevent the journal box 17 from being turned excessively on the inner side of the guide groove 29 which is provided at the upper open end portion of the valve case 28. The tenon-inserting recesses 32a shown in FIG. 7C in the lower open end portion of the circumferential wall of the valve case 28 are opposed to the tenons 34 shown in FIG. 7A on the valve base 33 which will be described later. The valve base 33 is also provided with bores 35, 35a therethrough, in which ring packings 36, 36a (FIG. 7D) are inserted. The journal box 17 shown in FIG. 7B is formed tubularly so as to have a rectangular horizontal section. A movable disc type seat member 37 having tenons 34a on its bottom surface is joined unitarily to the journal box 17. The opposite side walls, which have a larger width, of the journal box 17 are provided with horizontally elongated bores 38 so that these bores 38 are aligned with each other in the direction which is at right angles to a vertical shaft-inserting bore 39. The operating shaft shown in FIG. 6A is made flat on two sides and has a cross-sectional shape identical with that of the shaft-inserting bore 39 of FIG. 7B. The diameter of the operating shaft 18 is set slightly smaller than that of the shaft-inserting bore 39. The opposite non-flat side surfaces of the operating shaft 18 are provided with operating ends 44 in a projecting state, which contact the inner surfaces 43 (FIG. 7B) so as to move the journal box 17 forward and backward. As shown in FIG. 6A, the operating shaft 18 further has at its lower end portion a bore 45 through which a pin 50 is inserted to support the same shaft 18. The ring 46 shown in FIG. 6B has a disc-like construction with an annular groove 27a provided in the outer circumferential surface. Pin-inserting bores 45a, which are aligned with the pin inserting bore 45, are also made so as to extend through the annular groove 27a in its diametrical direction. The ring 46 further has a vertically extending rectangular through bore 47 into which the journal box 17 is inserted and supported, and a pair of rotation-preventing members 31a, which are opposed to the rotation-preventing members 31 on the upper surface of the valve case 28 shown in FIG. 5, are provided on the portions of the upper surface of the ring 4b close to the opposite ends of the rectangular bore 47. A ring 49, shown in FIGS. 1 and 2A, is provided on an open end surface of a cap 26 and is fitted in the guide groove 29 in the outer circumferential surface of an upper portion of the valve case 28 to form the valve-operating mechanism B. The steps of assembling the valve operating mechanism shown in FIG. 5 from a disassembled state shown in FIGS. 6A, 6B, 7A, 7B, 7C and 7D, and the further steps of combining the assembled product with the valve chamber 16 in the water mixing cock A shown in FIGS. 1 and 2A will now be described in detail. The ring packings 36, 36a shown in FIG. 7D are fitted in the bores 35, 35a in the valve base 33 shown in FIG. 7A, and the fixed plate 10 is placed on the valve base 33, as shown in FIG. 5, with the tenons 34 (FIG. 7A) of the valve base 33 fitted into recesses 32b (FIGS. 4A-4C) in the fixed plate 10, the tenons 34 being subsequently fitted in recesses 32a of the valve case 28. The movable plate valve 6 shown in FIG. 5 is placed on the fixed plate 10 so that the plate valve 6 can be turned with respect to the fixed plate 10 with the through chamber 3, as shown in FIGS. 4A-4D, opposed to the hot water inlet 13, the cold water inlet 14, and outlet 12. The journal box 17 shown in FIG. 7B is then placed on the movable plate valve 6, as shown in FIG. 5, and the tenons 34a (FIG. 7B) at the bottom surface of the journal box 17 are fitted into the recesses 32 in the plate valve of FIG. 5. The ring 46 is then fitted around the journal box 17 from the upper portion thereof, and the operating shaft 18 is inserted into the bore 39 in the journal box 17. The non-inserting bores 45a in the ring 46 shown in FIG. 6B, the elongated bores 38 in the journal box 17 shown in FIG. 7B, and the pin-inserting bore 45 in the operating shaft 18 shown in FIG. 6A are aligned with one another, and the pin 50 is inserted through these bores, as shown in FIG. 5. The resultant product is set in the valve case 28 to complete the assembling of the valve operating mechanism B. This valve operating mechanism B is placed in the valve chamber 16 in the mixed water cock A shown in FIGS. 1 and 2A, and the cap 26 is put on the valve chamber 16 to complete the assembling of the mixed water cock A. When the assembling of the valve operating mechanism B has been completed, the hot water passage 22 in the mixed water cock A of FIG. 2A and the hot water inlet 13 of the fixed plate 10 shown in FIGS. 4A-4D are communicated with each other. The water passage 24 of FIG. 2A and the cold water inlet 14 of the fixed plate 10 shown in FIGS. 4A-4D are communicated with each other. As shown in FIG. 2A, the outlet 12 and the passage 20 are communicated with each other at the same time. As a result, the shifting of the valve mechanism B can be done freely by operating the lever 19.

Figure 4B:
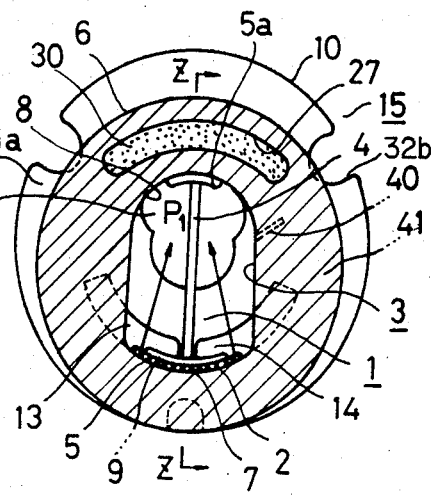

In order to discharge the hot water and cold water at the same rate into the discharge pipe 21 shown in FIG. 1, the lever 19 is turned in a predetermined direction, so that the movable plate valve 6 connected to the lever 19 via the operating shaft 18 is displaced quickly from the valveclosing position shown in FIG. 4A to the position shown in FIG. 4B. This valve-opening operation causes the hot water inlet 13 and the cold water inlet 14 to be opened to the same level. Consequently, the hot water which has reached the hot water outlet 23 and cold water outlet 25 shown in FIGS. 2A and 2B flows from the hot water inlet 13, which is shown in FIGS. 4A-4D and is communicated with the hot water outlet 23 of FIG. 2A, into the through chamber 3. The cold water flows into the same chamber 3 via the cold water inlet 14 which is shown in FIGS. 4A-4D and is communicated with the cold water outlet 25 of FIGS. 2A. The hot water and cold water flow at the same rate. During this time, the hot water and cold water flow from the hot water inlet 13 and cold water inlet 14 into the through chamber 3 as they impinge upon or skim along the lower end surface (shown in FIG. 3B) of the sound arrester member 2, which is disposed along the outer edge of the end surface 9 of the inlet portion of the through chamber 3 and the inner surface 7 thereof, as shown by arrows P in FIG. 3B, to effectively deaden the noise of the water, which noise occurs when the valve mechanism is opened suddenly. The water then passes the interior of the through chamber 3 as shown by an arrow P1 in FIG. 3B. The water then flows into the discharge pipe 21 of FIG. 1 through the outlet 12 communicated with the through chamber 3 shown in FIG. 4B and also communicated with the passage 20 shown in FIG. 1. The water in which the hot water and cold water has been thoroughly mixed is thus fed during this time. When the temperature of the mixed water is low, the lever 19 is turned to the left in FIG. 2A (front elevation), the hot water inlet 13 shown in FIG. 4B is widened slightly, and the cold water inlet 14 also shown in FIG. 4B narrows correspondingly to the displacement amount of the lever 19, so that the temperature of the mixed water increases. When the temperature of the mixed water is high, the lever 19 of FIG. 2A may be turned in the direction opposite to the direction referred to above. The cap 26 is so designed that it can be turned to the left and right freely with the lever 19.

Figure 4C:
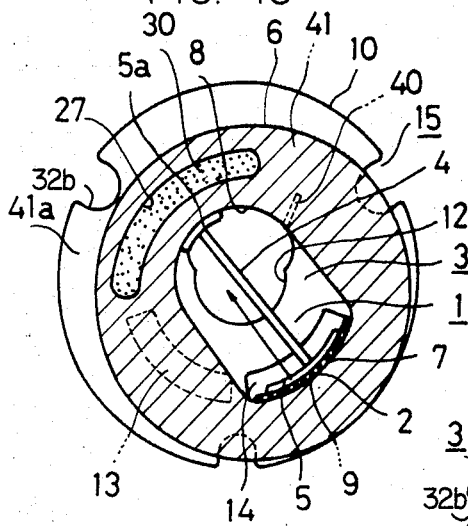
Figure 4D:
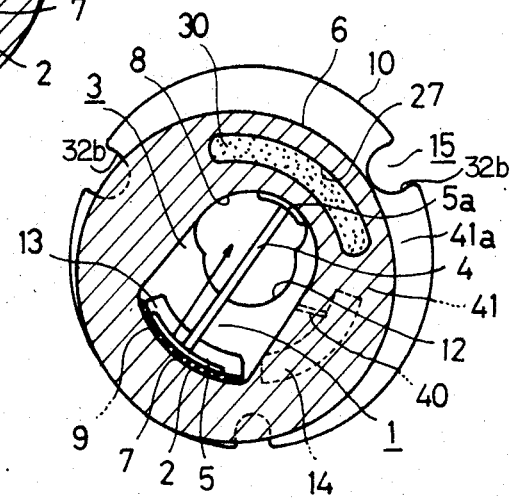

When cold water alone is required, the lever is displaced all the way to the right, so that the through chamber 3 and the cold water inlet 14 are opposite each other as shown in FIG. 4C to enable cold water alone to be fed. When the lever 19 is displaced all the way to the left, the through chamber 3 and the hot water inlet 13 are opposed to each other as shown in FIG. 4D to enable hot water alone to be fed. When hot water is fed continuously, the cold water is trapped in the interior of the check valve unit C shown in FIG. 2 in the water passage 24 and provided with the check valve 42. The cold water inlet 14 of FIGS. 4A-4D is heated gradually with the hot water passing through the chamber 3 and the mixed water passage 20, so that the volume of the cold water starts increasing. Since the through chamber 3 and the cold water inlet 14 are communicated with each other during this time via the variable escape groove 40 provided in the cut-off surface 41 of the movable plate valve 6, and the variable escape groove 40 is formed by the cut-off surface 41a of the fixed plate 10, the expanded portion of the cold water is discharged from the variable escape groove 40 into the through chamber 3. Consequently, an increase in the pressure in the water passage 24 due to the continuously-fed hot water can be prevented. This enables the prevention of breakage of the check valve unit C and other parts.

This device which is constructed as described above has the following advantages.

(1) A sound arrester unit is provided on the inner surface of the inlet portion of a through chamber 3 which is provided in a movable plate valve 6. This sound arrester unit 1 consists of a sound arrester member 2 composed of a porous foamed metal, a net or steel wool, and a support member 4 by which the arrester member is fixed to the mentioned surface. Accordingly, a jet stream of a pressure fluid, which occurs when the valve mechanism 15 is opened suddenly, and which flows from the hot water inlet 13 and cold water inlet 14 into the through chamber 3, impinges upon or skims along the sound arrester member 2 which is provided so as to extend along the end surface of an inlet portion of the through chamber 3 and the inner surface thereof. Thus, the noise, which occurs due to the jet stream of the water, can be reduced to a great extent.

(2) The sound arrester member 2 of the sound arrester unit 1 consists of a flat material extending along the inner surface of the inlet portion of the through chamber 3 and attached thereto firmly and stably by the support member 4. Therefore, even when the sound arrester member 2 receives a jet stream of the fluid continuously, which occurs when the valve mechanism 13 is opened suddenly, it does not come off easily, nor is it damaged. However, the sound arrester member 2 does not require the flow rate of the fluid to be restricted even when the degree of clogging thereof varies, and is free from the failure in its ability to regulate the temperature of the fluid properly even when it is clogged.

(3) The support member 4 of the sound arrester unit 1 consists of a rod type material so as not to occupy the space in the through chamber 3 unnecessarily, and has contact member 5 and 5A attached to both ends thereof so as to extend along the inner surface of the through chamber 3. Accordingly, the support member 4 does not restrict the flow rate of the water, nor does it obstruct the flow of the water. Also, it does not come off even when the water pressure is applied thereto. Since the support member 4 is fixed to the portions of the inner surface of the through chamber 3 which portions are deep therein, the durability and stability thereof with respect to the pressure fluid can be improved.

(4) The movable plate valve 6 is provided with a variable escape groove 40. This escape groove 40 and the cut-off surface 41a of the fixed plate 10 form a discharge water passage. The through chamber 3 and the water passage are communicated with each other only when the hot water is fed continuously. Therefore, even when the water in the water passage is heated with a heat medium consisting of hot water, to be expanded, the expanded portion of the water is discharged into the through bore via the variable escape groove 40 to thereby enable an increase in the water pressure to be regulated properly. Hence breakage of the check valve unit C and other parts can be prevented.

(5) Since the variable scope groove 40 in the movable plate valve 6 is made shallow, the quantity of the water per unit time flowing out from the discharge water passage, which is formed by this small groove 40 and the cut-off surface 41a of the fixed plate valve 10, is extremely small, and such water has no influence upon the temperature of the hot water being fed.

(6) An operating shaft 18 having operating ends 44 at the front and rear portions thereof with respect to the pivotal direction of the same shaft 18 is supported in the journal box 17 via a pin 50 so that the operating shaft 18 can be turned vertically and horizontally. The journal box 17 is supported in such a manner that it can be turned longitudinally and laterally about the pin 50 within the ring 46. Since the cut-off surface 41a is lubricated with a lubricant provided in a recess in the movable plate valve 6, the operating efficiency of the lever 19 can be improved to a great extent, and moreover, the shifting of the valve mechanism 13 can be done reliably.

(7) The sound arrester member 2 in this device is arranged stably as compared with that in a conventional device of this kind. Therefore, it is not damaged and clogged. Moreover, thermal expansion of the water can be prevented owing to the variable escape groove 40, so that the valve mechanism B can be kept in an excellent operating condition for many years. In addition to the high durability of the valve mechanism B, which was attained owing to the development of stable means for preventing the thermal expansion of the water, and increasing the degree of lubrication of the cut-off surfaces 41 and 41a of the movable plate valve and fixed plate 6 and 10, respectively, the device in the present application has a further advantage that a troublesome operation, such as a treatment for a clogged sound arrester member 2 can be rendered unnecessary.

What is claimed is:

1. A water mixing cock having a noise-preventing structure, comprising:

a valve case;

a fixed plate mounted in said valve case, said fixed plate having a hot water passage and a cold water passage therethrough;

a movable plate valve having a cut-off surface disposed in opposition to and slidable with respect to the fixed plate;

a hollow chamber being formed in the movable plate valve and having an inlet portion for selectively interconnecting said hot water passage, said cold water passage or both passages with said hollow chamber;

a sound arresting member disposed in the inlet portion of the hollow chamber;

valve operating means, arranged in contact with the fixed plate and the movable plate valve, for moving the movable plate valve to allow passage of hot water, cold water, or mixed hot and cold water through said inlet portion into the hollow chamber;

a discharge water passage arranged in communication with the hollow chamber; and a variable escape groove means, cut into the cut-off surface of the movable plate valve, for communicating the hollow chamber and the cold water passage in the fixed plate with each other when the inlet portion of the hollow chamber is in fluid communication with only the hot water passage in the fixed plate;

whereby noise occurring when the movable plate valve is moved by the valve operating means is minimized.

2. The water mixing cock according to claim 1, wherein said valve operating means includes:

said valve case surrounding the fixed plate and the movable plate valve;

a journal box arranged on the movable plate valve in the valve case;

an operating shaft inserted into an opening in the journal box;

means disposed between the journal box and the valve case, for spacing the journal box from the valve case; and a pin inserted through aligned openings in the journal box, the spacing means and the operating shaft, whereby the movable valve plate may be moved by movement of the operating shaft.

* * * * *